United States Patent
Pradhan et al.

(10) Patent No.: US 7,104,437 B2
(45) Date of Patent: Sep. 12, 2006

(54) SYSTEM AND METHOD FOR VARIABLY RESOLVED IDENTIFICATION TAGS

(75) Inventors: Salil Pradhan, Santa Clara, CA (US); Mehrban Jam, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/396,999

(22) Filed: Mar. 25, 2003

(65) Prior Publication Data

US 2004/0188514 A1    Sep. 30, 2004

(51) Int. Cl.
*G06F 17/00* (2006.01)
(52) U.S. Cl. .................. 235/375; 235/380; 235/385
(58) Field of Classification Search ............... 235/375, 235/376, 383, 385, 472.01–3, 380; 702/94–96
See application file for complete search history.

(56) References Cited

U.S. PATENT DOCUMENTS

| | | | | |
|---|---|---|---|---|
| 5,673,190 A * | 9/1997 | Kahleck et al. ............... 700/2 |
| 5,856,931 A * | 1/1999 | McCasland ................ 702/182 |
| 6,032,861 A * | 3/2000 | Lemelson et al. ........... 235/456 |
| 6,073,110 A * | 6/2000 | Rhodes et al. ................. 705/8 |
| 6,164,535 A * | 12/2000 | Goodwin, III ............... 235/383 |
| 6,176,425 B1 * | 1/2001 | Harrison et al. ............ 235/385 |
| 6,269,342 B1 * | 7/2001 | Brick et al. ................... 705/20 |
| 6,318,636 B1 * | 11/2001 | Reynolds et al. ....... 235/472.01 |
| 6,327,623 B1 * | 12/2001 | Watts ........................ 709/229 |
| 6,505,780 B1 * | 1/2003 | Yassin et al. ............... 235/492 |
| 6,614,450 B1 * | 9/2003 | Vossler ........................ 715/751 |
| 6,616,047 B1 * | 9/2003 | Catan .................... 235/472.02 |
| 6,618,683 B1 * | 9/2003 | Berstis et al. ................. 702/94 |
| 6,676,014 B1 * | 1/2004 | Catan ......................... 235/375 |
| 6,687,346 B1 * | 2/2004 | Swartz et al. ............ 379/93.12 |
| 6,715,676 B1 * | 4/2004 | Janning ...................... 235/383 |
| 6,766,956 B1 * | 7/2004 | Boylan et al. ......... 235/462.45 |

* cited by examiner

*Primary Examiner*—Ahshik Kim

(57) ABSTRACT

A system and method for identification tag resolution is disclosed. The method discloses the elements of: identifying a set of attributes for a structure; assigning a tag to the structure; scanning the tag with a tag scanner; and modifying the structure's attributes, in response to scanning the tag. The structure's attributes can be modified in response to a value of a variety of variables, including a spatial variable, an orientational variable, a temporal variable, and a trust variable. The method also discloses that devices can be located proximate to the structure and, after a set of attributes identified for the device, the device's attributes can then be modified in response to scanning the tag. Also disclosed is that a set of attributes for the tag scanner can be identified and modified in response to scanning the tag. The system discloses all means for effecting the method.

23 Claims, 3 Drawing Sheets

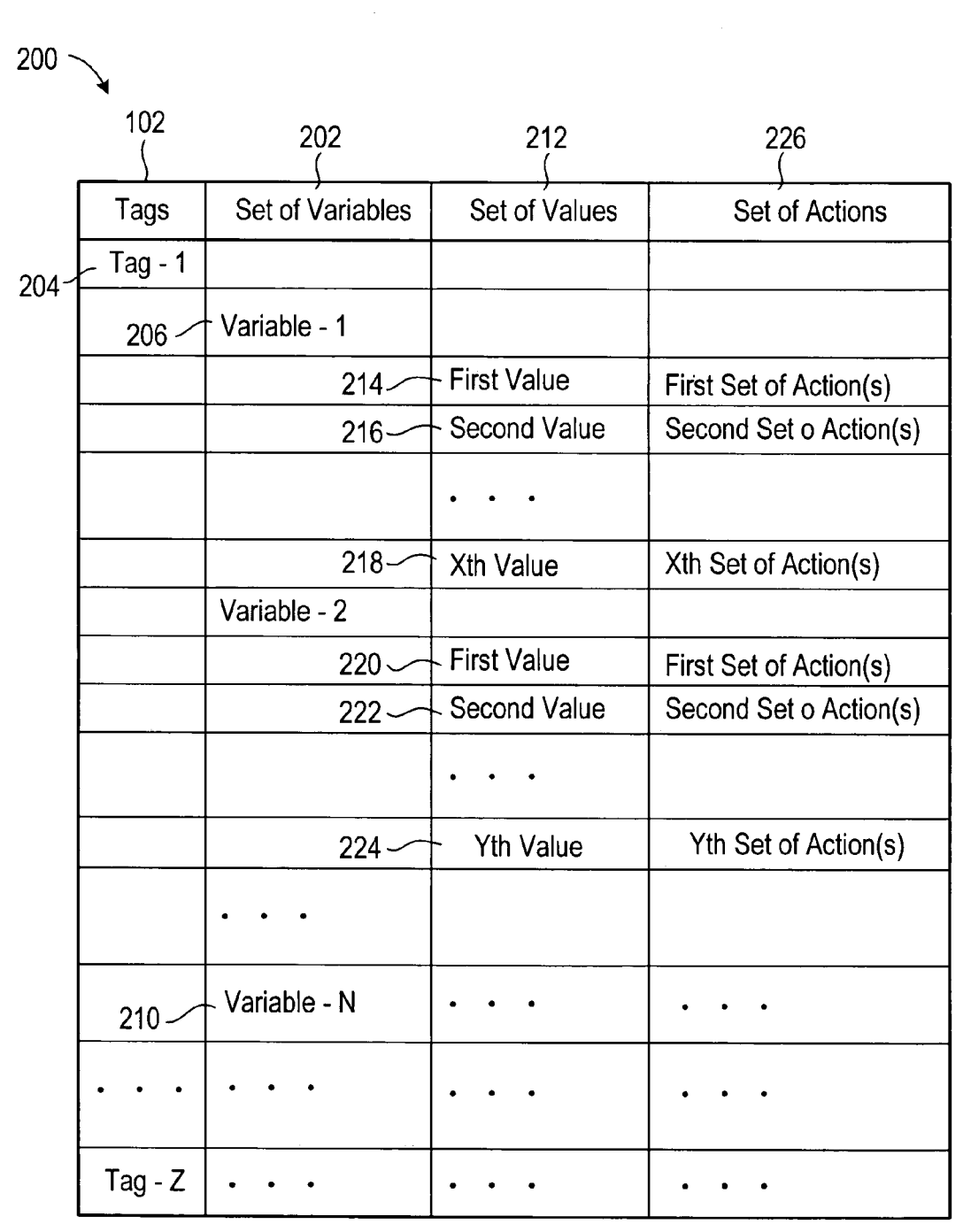

| Tags | Set of Variables | Set of Values | Set of Actions |
|---|---|---|---|
| Tag - 1 | | | |
| | Variable - 1 | | |
| | | First Value | First Set of Action(s) |
| | | Second Value | Second Set o Action(s) |
| | | . . . | |
| | | Xth Value | Xth Set of Action(s) |
| | Variable - 2 | | |
| | | First Value | First Set of Action(s) |
| | | Second Value | Second Set o Action(s) |
| | | . . . | |
| | | Yth Value | Yth Set of Action(s) |
| | . . . | | |
| | Variable - N | . . . | . . . |
| . . . | . . . | . . . | . . . |
| Tag - Z | . . . | . . . | . . . |

Fig. 2

SYSTEM AND METHOD FOR VARIABLY RESOLVED IDENTIFICATION TAGS

BACKGROUND OF THE INVENTION

1. Field of the Invention

The present invention relates generally to systems and methods for resolving identification tags, and more particularly for variably resolved identification tags.

2. Discussion of Background Art

Universal Product Code (UPC) and RF-Identification (RFID) tags are a fixture in modern businesses. They are tools for enabling computers to associate a fixed set of information with each item carrying such tags. Such tags are often placed on goods for sale, so that a fixed set of product information, such as a model number and serial number, and a sales price, can be retrieved.

During use, a unique tag is scanned in some manner, interpreted, and a set of information corresponding to that unique tag is retrieved. Each time that unique tag is scanned the information retrieved is the same. In this way, for example, a store can consistently and automatically charge a certain predetermined price for each item for sale carrying one of these unique tags, so that the checkout person need not repetitively punch in the same price every time the same item is checked out. Similarly, during inventory management, a business can track it's capital equipment more efficiently by scanning such a tag, placed on an item, than by having an operator manually key in item information. It is this one-to-one correspondence between the tag and the item it represents which in the past has greatly improved the efficiency of many business enterprises.

Such a use, however beneficial, is also very rigid, especially in an increasingly mobile yet constantly connected modern culture. It is this very one-to-one correspondence, between the tag and the information the tag points to, which while useful, does not dynamically take into account the many variables affecting business enterprises and their customers.

In response to the concerns discussed above, what is needed is a system and method for resolving identification tags that overcomes the problems of the prior art.

SUMMARY OF THE INVENTION

The present invention is a system and method for identification tag resolution. The method of the present invention includes the elements of: identifying a set of attributes for a structure; assigning a tag to the structure; scanning the tag with a tag scanner; and modifying the structure's attributes, in response to scanning the tag. The structure's attributes can be modified in response to a value of a variety of variables, including a spatial variable, an orientational variable, a temporal variable, and a trust variable.

Also devices can be located proximate to the structure and, after a set of attributes identified for the device, the device's attributes can then be modified in response to scanning the tag. Simlarly, a set of attributes for the tag scanner can be identified and modified in response to scanning the tag.

Within the system of the present invention, are all means for effecting the method. These and other aspects of the invention will be recognized by those skilled in the art upon review of the detailed description, drawings, and claims set forth below.

BRIEF DESCRIPTION OF THE DRAWINGS

FIG. 2 is a data structure used within one embodiment of the system; and

DETAILED DESCRIPTION OF THE PREFERRED EMBODIMENT

The present invention's system and method for variable identification tag resolution, varies what actions are taken in response to a tag scan, even though the information retrieved from a tag itself can remain the same. This responsiveness is enabled by collecting information from sources other than the tag which then help resolve what specific information is retrieved and/or actions taken in response to a tag scan. Such a variably responsive result makes the present invention particularly advantageous over the prior art.

Figure 1:
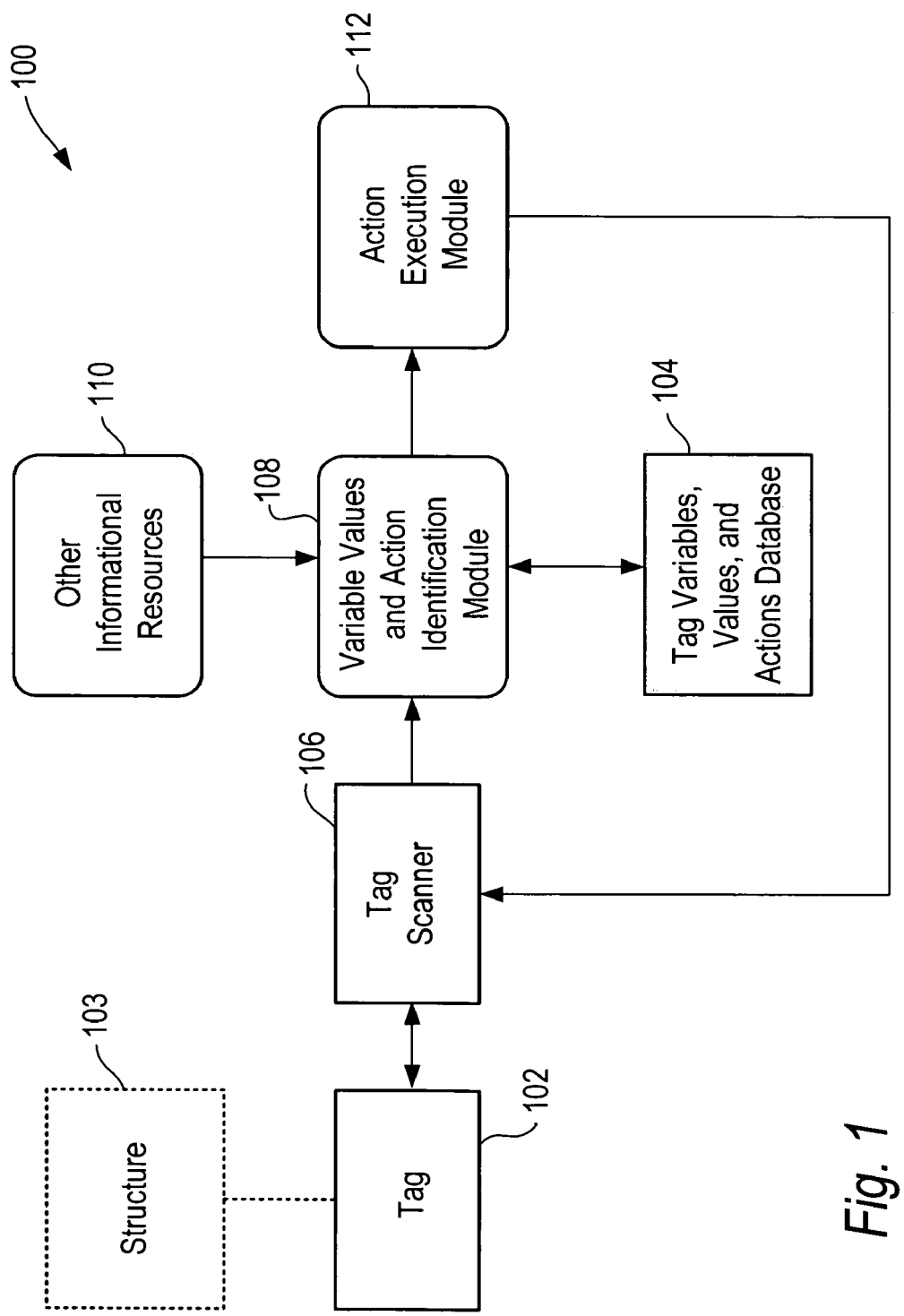
FIG. 1 is a dataflow diagram of one embodiment of a system for variable identification tag resolution.
Figure 3:
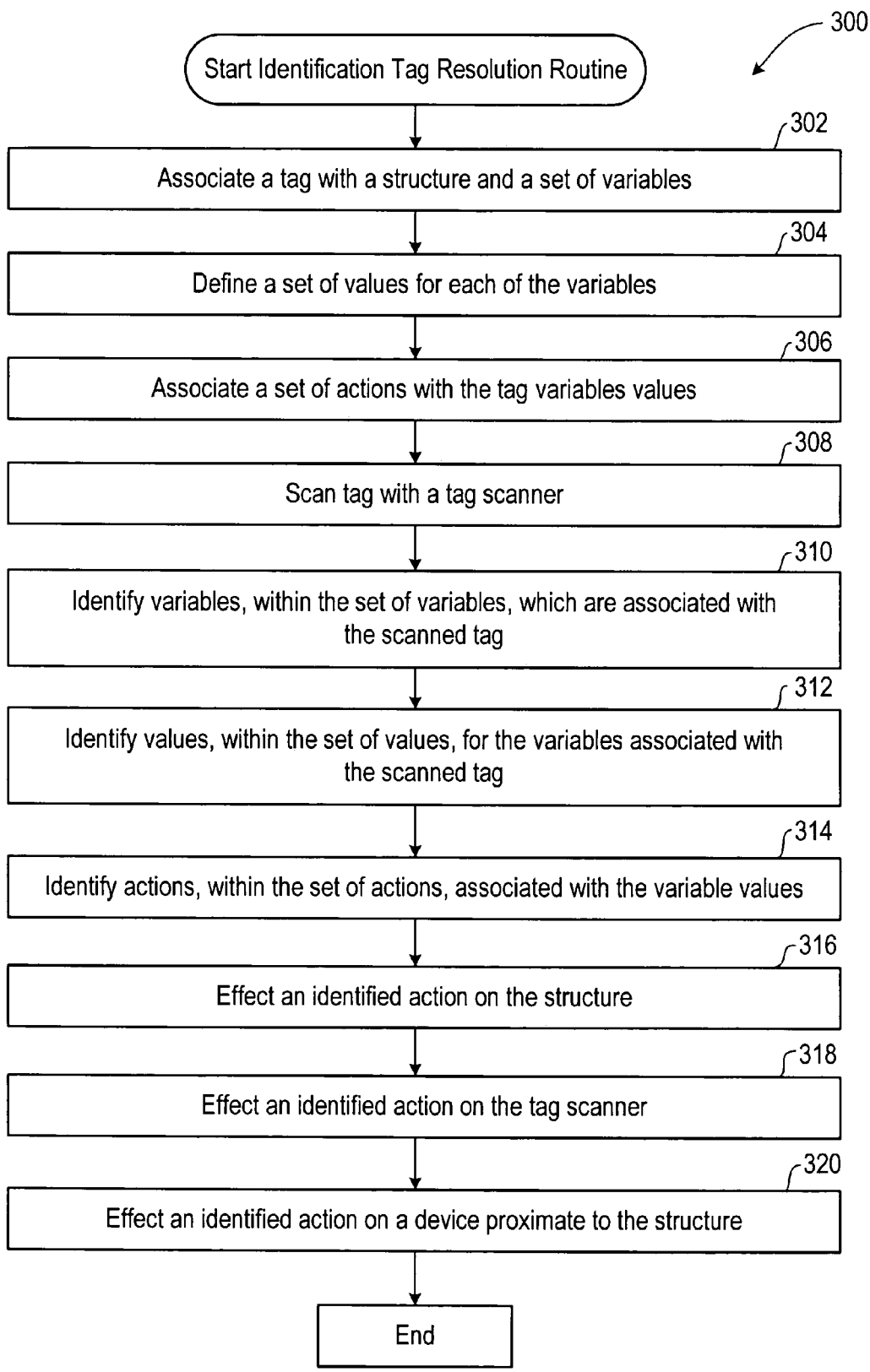
FIG. 3 is a flowchart of one embodiment of a method for variable identification tag resolution.

FIG. 1 is a dataflow diagram of one embodiment of a system 100 for variable identification tag resolution. "Tag resolution" is herein defined as the process of collecting and interpreting a variety of information, including tag information, in order to determine what actions are taken in response to a tag scan. FIG. 2 is a data structure 200 used within one embodiment of the system 100. FIG. 3 is a flowchart of one embodiment of a method 300 for variable identification tag resolution. FIGS. 1, 2, and 3 are herein discussed together.

The system 100 includes a tag 102 to be read and/or scanned. The tag 102 is preferably associated with (i.e. assigned to) some sort of structure 103. Structures' are vary broadly defined to include: objects, devices, computers, rooms, buildings, geographic areas, data items, and so on. The tag can also take many different forms, including: a Universal Product Code (UPC) barcode tag, RF-Identification (RFID) tag, a virtual tag (i.e. such as a GPS location based tag), or some other sort of tag known to those skilled in the art.

The method 300 begins in step 302, where a tag variables, values, and actions database 104 associates the tag 102 with the structure 103 and a set of variables 202. The database 104 may be hosted in many ways, including by a networked central computer, or downloaded into a handheld computer. For example, the data structure 200 provides an example where "Tag-1" 204 is associated with variables "Variable-1" 206 through "Variable-N" 210. The set of variables 202 can vary from tag to tag depending upon what the tags 102 are associated with. The set of variables 202 can be grouped in to a very wide variety of classes, including spatial, orientational, temporal, levels of trust, and so on.

Next, in step 304, a set of values 212 is defined for each variable within the set of variables 202 and stored in the database 104. For instance, if Variable-1 206 is a spatial variable, then each Value 214 through 218 might correspond to a different store within chain of retail stores, a different room within a building, a different building within a city, and so on, including even every different GPS location on a planet. Similarly, if Variable-2 208 is a orientational variable, then each Value 220 through 214 might correspond to a different location on a compass. And, if Variable-N 210 is a temporal variable, then each of its Values might correspond to a different times of a day, week, month, year, and so on. Those skilled in the art will recognize that many, many more variables and corresponding sets of values are possible depending upon how the present invention is used and what the tags 102 are associated with.

In step 306, a set of actions 226 are associated with the tag variables values, either directly, combinationally, or permutationally, within the database 104. To clarify, if a tag has as a set of variables having a particular set of values, then the database 104 will associate with that tag, a particular set of actions. The particular set of actions may be directly dependent upon specific values of specific variable, or may be dependent upon some combination or permutation thereof. The data structure 200 in FIG. 2, for simplicity, only shows an embodiment where the actions are directly dependent upon specific values of specific variable. Those skilled in the art however, will know that an "N" dimensional matrix would more generally identify a particular set of actions to be associated with a tag having a particular set of variables having a particular set of values.

Those actions within the set of actions 226 are completely dependent upon how the present invention is used, however, the actions may include in no particular order: retrieving, modifying, displaying, downloading, printing, and/or storing information; varying service, trust, and/or permission levels; navigating to a web page; performing calculations; scheduling a room; generating a store coupon; and many, many others.

Next in step 308, a tag scanner 106 scans one or more of the tags 102. The scanner 106 may take a variety of forms, but is preferably included within a handheld computer, such as a cell phone or PDA. The scanner 106 may also include other devices and sensors capable of supplying values for the set of variables 202 associated with the tags 102. Such other devices include: a spatial device, such as a GPS receiver; an orientational device, such as a compass or accelerometer; and a temporal device, such as a clock. Those skilled in the art will recognize many other devices which can also supply variable values.

In step 310, a Variable Values, and Action Identification Module 108 receives the scanned tag information from the tag scanner 106, and identifies in the database 104 variables, within the set of variables 202, which are associated with the tags 102 scanned. The tag scanner 104 can communicate this information to the identification module 108 using a wireless network, a cellular network, a hardwired network, or any other network known to those skilled in the art.

In step 312, the identification module 108 then identifies a current set of values, within the set of values 212, for the variables associated with the scanned tags 102. The values obtained by the identification module 108 may come from either the tag scanner 106 and its associated devices and sensors, and/or other informational resources 110. The other resources 110 include databases and other device and sensor resources.

Then in step 314, the identification module 108 identifies in the database 104 actions, within the set of actions 226, which are associated with the variable values. In step 316, one or more identified actions are effected by an action execution module 112 on the structure 103. For example, if the structure is a room, the effected action may be to modify the rooms' attributes, such as its schedule or environmental settings; or, if the structure is a printer, the effected action may be to modify the printer's attributes such as by enabling a unique set of printing permissions.

The execution module 112 also may effect one or more of the actions on the tag scanner 106, in step 318. For example, if the tag scanner 106 is a handheld computer, the effected action may be to modify the scanner's display attributes by displaying a web page.

Similarly, the execution module 112 may effect one or more of the actions on a device proximate to the structure 103, in step 320. Devices "proximate to" the tag scanner 106 are herein defined to include: a nearby computer, display, or printer; a second handheld computer; or in general, any device which preferably can readily be accessed or viewed by a user who uses the tag scanner 106 to scan one or more of the tags 102. For example, if the structure is an item in a store for sale, the proximate device might be a nearby printer, and the effected action may be to modify the printer's attributes such that a coupon out corresponding to the item for sale is printed out.

Preferably, the database 104, the identification module 106, and the action execution module 112 are effected by a central server (not shown), perhaps covering a wide geographic region, such as an entire State or Country. The tags 102, tag scanner 106 and other resources 110, however, could be located anywhere, but are networked to the central server.

In summary, by scanning a tag, a cascade of events occur, including identifying variable values, which in turn affects what actions are executed. Should any one of the variable values change, a completely different set of actions may result, even though the tag scanned stays the same.

For illustrative purposes the following examples are given, however, those skilled in the art recognize that these examples are but a fraction of possible present invention implementations.

In a first example, a tag is affixed to a room. If the room has only one location, that is to say it is not mobile, an associated location variable will have only one possible value. A second variable may be temporal. Values of the temporal variable may range from the beginning to the end of a work day. Actions associated with the values of these two variables may be meetings scheduled within the room. Should a user scan this tag, the user would know and be able to schedule meetings for this room.

In a second example, a tag is affixed to a mobile printer. A first variable may be the printers model and serial number, indicating the printer's capabilities. A second variable may indicate the printer's location. A third variable may be time. Actions associated with the values of these three variables may include: permitting global access to the printer if the printer is located within a lobby of a building, but only between the hours of 8 AM to 5 PM; permitting only single user access to the printer if the printer is located within a specific office within the building, but at anytime during the day; and so on. Should a visitor scan this tag, the visitor would be able to print from the printer only if the printer was located in the lobby and then only between 8 AM and 5 PM.

In a third example, a tag is affixed to a good for sale in a retail store. A first variable may be the good's characteristics. A second variable may indicate which store the good is located. A third variable may be time. Actions associated with the values of these three variables may include: printing a 50% coupon if the good is located in store A during a week with the good is "on-sale;" or displaying information about the good on a handheld device if the good is located in store B and the good is not marked down for sale. Should a store customer scan this tag, the customer would receive a coupon if they are in store A during the on-sale period, but only information about the good if they are in store B.

While one or more embodiments of the present invention have been described, those skilled in the art will recognize that various modifications may be made. Variations upon and modifications to these embodiments are provided by the present invention, which is limited only by the following claims.

What is claimed is:

1. A method comprising:
   associating an identification tag with a structure and with first and second variables, the first variable being different than the second variable;
   scanning the tag with a tag scanner to retrieve, from a remote loction, a first value for the first variable;
   utilizing a first device, included in the tag scanner, to generate a second value for the second variable; and
   utilizing both the first and second values to effect an action on a second device that is proximate to the structure and separate from the tag scanner and first device, wherein utilizing a first device includes using a clock to generate the second value.

2. The method of claim 1 wherein utilizing both the first and second values includes effecting action on a room.

3. The method of claim 2 wherein effecting action on a room includes modifying one of a schedule for the room and environmental settings for the room.

4. The method of claim 1 wherein utilizing both the first and second values includes effecting action on a nearby printer.

5. The method of claim 4 wherein effecting action on a nearby printer is selected from the group consisting Of causing the printer to print and modifying attributes of the printer to enable printing permission.

6. The method of claim 1 wherein utilizing both the first and second values includes effecting action on a nearby display that is separate from the tag scanner and first device.

7. The method of claim 1 wherein utilizing both the first and second valued includes effecting action on a nearby computer that is separate from the tag scanner and first device.

8. The method of claim 1 wherein the first device is a sensor.

9. The method of claim 1 wherein the first device is an accelerometer.

10. The method of claim 1 wherein the first device is a global positioning system (GPS) receiver, and the second variable is a spatial location of the identification tag.

11. A method comprising:
    associating an identification tag with a structure and with a first variable;
    scanning the tag with a first device to retrieve a first value for the first variable;
    utilizing a second device, included with the first device, to generate a spatial value; and
    utilizing both the first value and the spatial value to effect an action on a third device that is proximate to the tag and separate from the first and second devices.

12. The method of claim 11 wherein utilizing a second device to generate a spatial value comprises utilizing a GPS receiver to identify a location of the tag.

13. The method of claim 11 wherein utilizing both the first value and the spatial value to effect an action on a third device includes downloading and storing information to a computer.

14. The method of claim 11 further comprising:
    utilizing a fourth device, included with the first and second devices, to generate a temporal value; and
    utilizing three different values of the first value, the spatial value, and the temporal value to effect an action on the third device that is proximate to the tag and separate from both the first, second, and third devices.

15. The method of claim 14 wherein utilizing a fourth device includes using a clock to generate the temporal value.

16. The meted of claim 11 wherein utilizing both the first value and the spatial value to effect an action on a third device includes permitting access to a printer, wherein access is permitted only within a specified time period.

17. A computer-usable medium embodying computer program code for commanding a computer to effect identification tag resolution, comprising:
    associating an identification tag, that is affixed to a structure, with a set of variables;
    scanning the tag with a first device to retrieve, from a remote location, a set of values for the set of variables;
    utilizing the first device to generate a spatial value and a temporal value; and
    utilizing the set of values and both the spatial and temporal values to effect an action on the structure.

18. The computer-usable medium of claim 17 wherein utilizing the set of values and both the spatial and temporal values to effect an action on the structure includes permitting access to the structure, wherein the structure is an electronic device.

19. The computer-usable medium of claim 18 wherein the electronic device is selected from the group consisting of a computer and a printer.

20. The computer-usable medium of claim 17 wherein utilizing the set of values and both the spatial and temporal values to effect an action on the structure includes modifying attributes of a room.

21. The computer-usable medium of claim 20 wherein modifying attributes of the room includes modifying a schedule of the room.

22. The computer-usable medium of claim 20 wherein modifying attributes of the room includes modifying environmental settings of the room.

23. A method, comprising:
    associating an identification tag with a structure and with first and second variables, the first variable being different than the second variable;
    scanning the identification tag with a handheld computer to retrieve, from a remote computer, a first value for the first variable;
    generating, with the handheld computer, a second value for the second variable, wherein the second value is a spatial location for the identification tag; and
    utilizing both the first and second values to effect an action on an electronic device that is proximate to the structure and separate from the handheld and remote computers.

* * * * *